United States Patent [19]

Faulkner

[11] Patent Number: 5,490,591
[45] Date of Patent: Feb. 13, 1996

[54] CONVEYOR WITH CLEATS HAVING A PRODUCT-CARRYING SURFACE AND AN OPPOSITE PRODUCT-RELEASING SURFACE

[76] Inventor: William G. Faulkner, 6701 Newman Dr., Oklahoma City, Okla. 73162

[21] Appl. No.: 368,198

[22] Filed: Jan. 4, 1995

[51] Int. Cl.[6] .................................................. B65G 47/38
[52] U.S. Cl. ...................... 198/803.13; 198/484.1
[58] Field of Search ............................. 198/484.1, 803.1, 198/803.13

[56] References Cited

U.S. PATENT DOCUMENTS

| | | | |
|---|---|---|---|
| D. 291,777 | 9/1987 | Lapeyre et al. | D8/499 |
| 912,600 | 2/1909 | McPherson . | |
| 1,027,352 | 5/1912 | Morse . | |
| 1,558,719 | 10/1925 | Sturtevant . | |
| 1,561,676 | 11/1925 | Wertman . | |
| 1,562,843 | 11/1925 | Müller . | |
| 1,563,065 | 11/1925 | Belcher . | |
| 1,564,798 | 12/1925 | Sturtevant . | |
| 1,565,760 | 12/1925 | Sutherland . | |
| 1,569,234 | 1/1926 | Müller . | |
| 1,638,388 | 8/1927 | Belcher . | |
| 1,649,845 | 11/1927 | Müller . | |
| 1,678,450 | 7/1928 | Sturtevant . | |
| 2,045,646 | 6/1936 | Harris | 263/8 |
| 2,413,843 | 1/1947 | Perry | 74/251 |
| 2,602,344 | 7/1952 | Bremer | 74/250 |
| 2,653,485 | 9/1953 | MacArthur | 74/253 |
| 2,667,791 | 2/1954 | Bremer | 74/245 |
| 2,774,460 | 12/1956 | Spoonhour | 198/484.1 |
| 3,159,267 | 12/1964 | Jeffrey | 198/193 |
| 3,261,451 | 7/1966 | Roinestad | 198/193 |
| 3,269,526 | 8/1966 | Imse et al. | 198/189 |
| 3,288,271 | 11/1966 | Burford | 198/803.13 X |
| 3,348,680 | 10/1967 | Mathews et al. | 209/84 |
| 3,547,248 | 12/1970 | Mencacci | 198/484.1 X |
| 3,724,285 | 4/1973 | Lapeyre | 74/243 FC |
| 3,939,964 | 2/1976 | Poerink | 198/195 |
| 4,041,822 | 8/1977 | Gabel | 198/803.13 X |
| 4,222,483 | 9/1980 | Wootton et al. | 198/831 |
| 4,390,093 | 6/1983 | Chard, Jr. et al. | 198/803.13 |
| 4,449,960 | 5/1984 | van der Lely | 474/242 |
| 4,507,106 | 3/1985 | Cole, Jr. | 474/215 |
| 4,581,001 | 4/1986 | Rattunde et al. | 474/214 |
| 4,654,227 | 3/1987 | Cornellier | 198/803.1 X |
| 4,729,469 | 3/1988 | Lapeyre et al. | 198/834 |
| 4,741,431 | 5/1988 | Whitehead | 198/844 |
| 4,832,183 | 5/1989 | Lapeyre | 198/699 |
| 4,832,187 | 5/1989 | Lapeyre | 198/851 |
| 4,858,753 | 8/1989 | Hodlewsky | 198/853 |
| 4,865,183 | 9/1989 | Hodlewsky et al. | 198/834 |
| 4,925,013 | 5/1990 | Lapeyre | 198/698 |
| 5,033,158 | 7/1991 | Petho | 198/484.1 X |

FOREIGN PATENT DOCUMENTS

| | | | |
|---|---|---|---|
| 0032797 | 7/1981 | European Pat. Off. . | |
| 0288409 | 10/1988 | European Pat. Off. . | |
| 0380201 | 8/1990 | European Pat. Off. . | |
| 0277125 | 11/1988 | Japan | 198/484.1 |
| 1044184 | 9/1966 | United Kingdom | 198/803.13 |
| 1066905 | 4/1967 | United Kingdom . | |
| 1475693 | 6/1977 | United Kingdom . | |
| 9000323 | 7/1990 | WIPO . | |

*Primary Examiner*—James R. Bidwell
*Attorney, Agent, or Firm*—Dunlap & Codding

[57] ABSTRACT

A conveyor with cleats having a curved product-carrying surface on one side and a curved product-releasing surface on the opposite side. The cleats are pivotally linked to form an endless loop. A sprocket assembly and motor are provided to rotate the endless loop. The cleats extend outwardly from the loop and are spaced such that product items may be disposed between adjacent cleats. The loop has a transfer bend where product items shift by gravity from one cleat to an adjacent cleat. At the point where product items exit from the conveyor, the curved product-releasing surface gently deposits the product items onto an output surface.

8 Claims, 5 Drawing Sheets

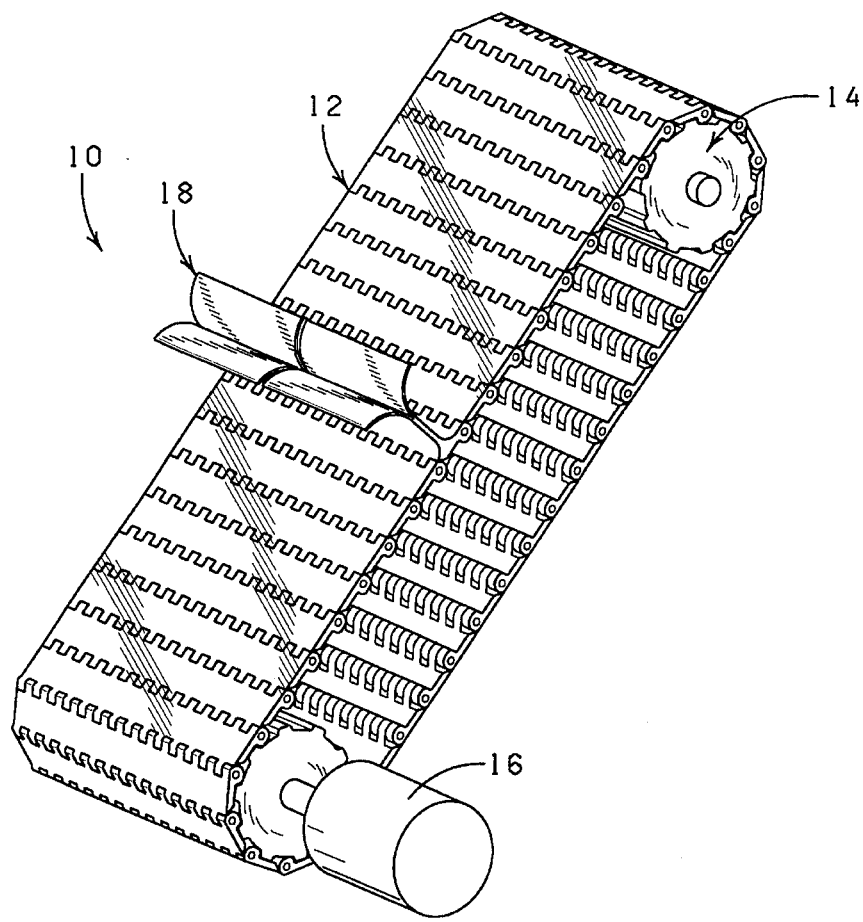

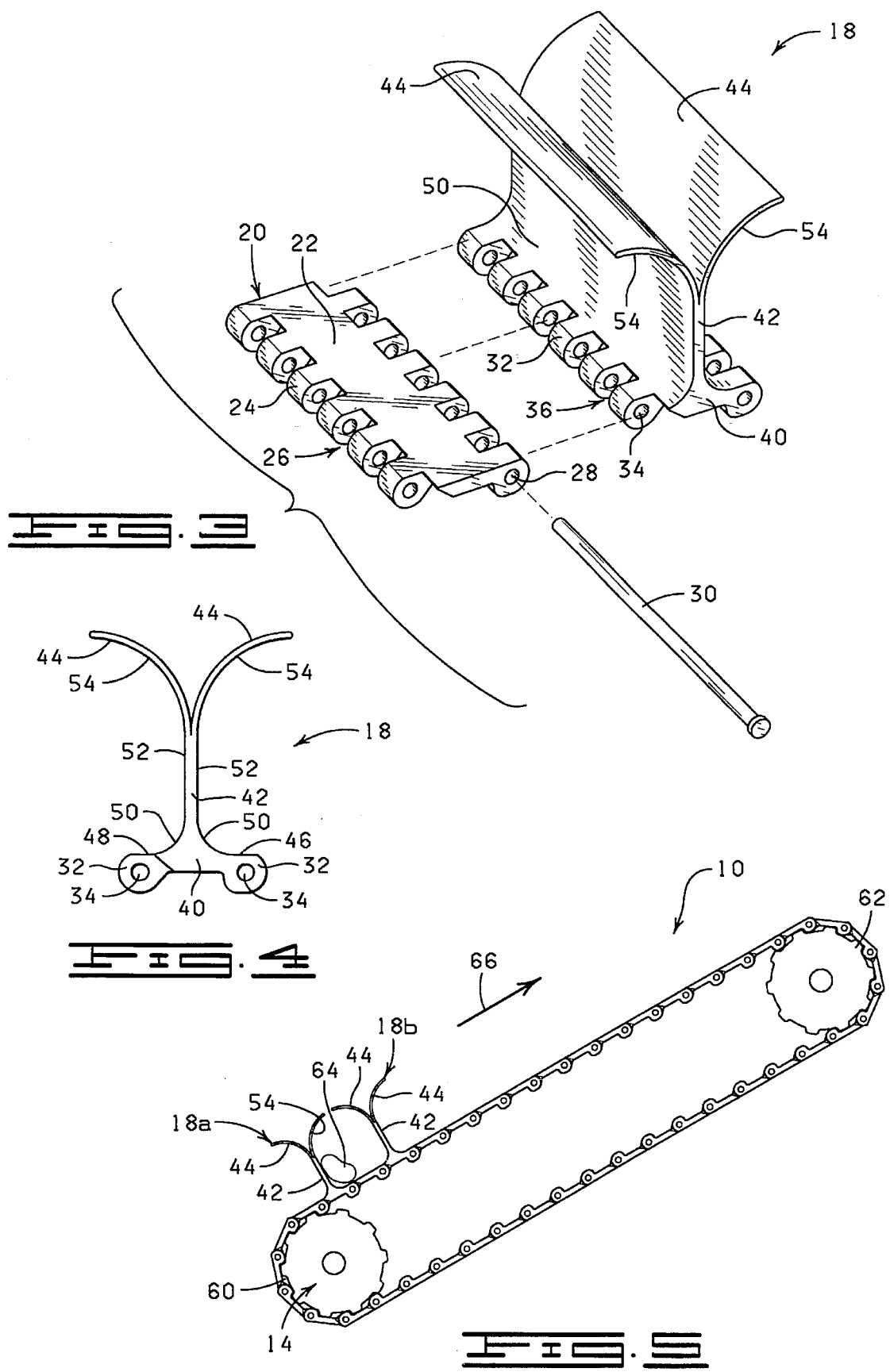

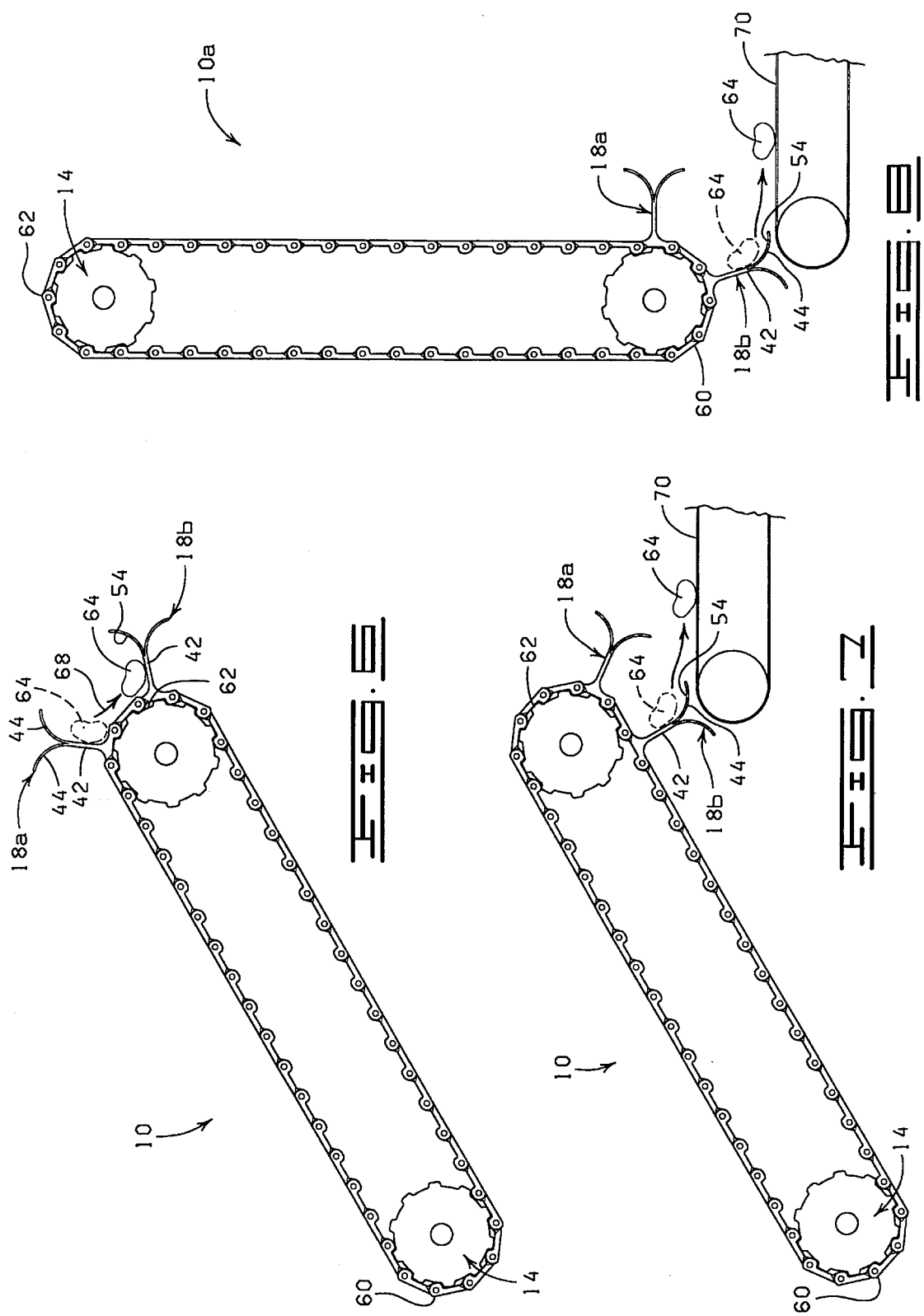

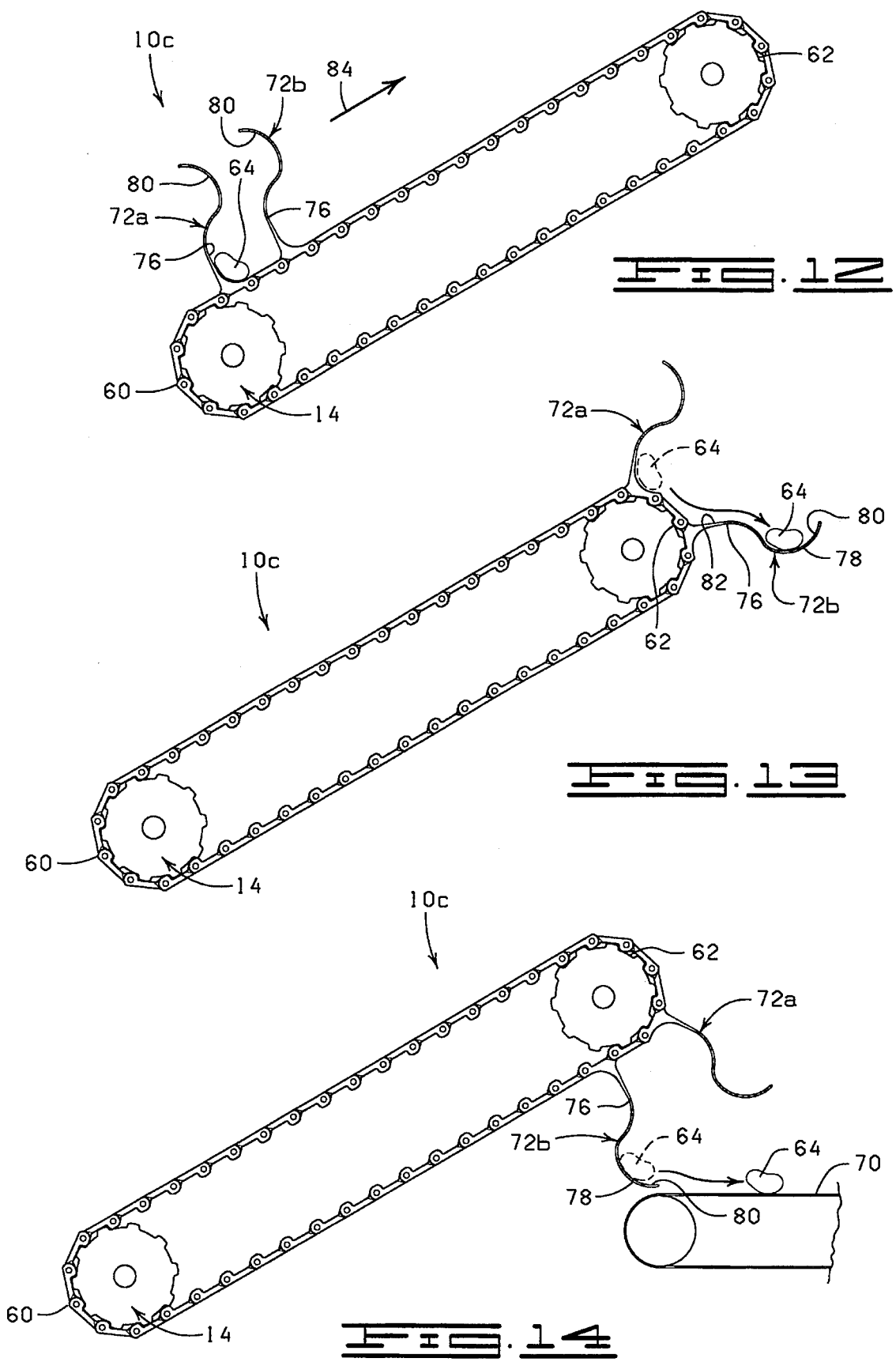

CONVEYOR WITH CLEATS HAVING A PRODUCT-CARRYING SURFACE AND AN OPPOSITE PRODUCT-RELEASING SURFACE

BACKGROUND OF THE INVENTION

1. Field of the Invention

The present invention relates generally to conveyors and particularly, but not by way of limitation, to conveyors composed of linked modules.

2. Description of Related Art

A wide variety of conveyors are known in the art. For example, U. S. Pat. No. 4,729,469 issued to Lapeyre et al. discloses a flat top conveyor belt which comprises a number of flat top modules linked together by cross pins. In an alternate embodiment, some rows of the Lapeyre conveyor belt may have flights which are orthogonal to the flat top surface. As stated in the Lapeyre disclosure, the orthogonal flights are useful to support products when the conveyor belt travels along an inclined path.

Orthogonal flights are suitable for supporting a product when the product is traveling upward. Upon reaching the point of exit from the conveyor belt, however, flat top belts and belts with orthogonal flights tend to drop or even sling the product. If the product is crackers, potato chips, cookies or anything which tends to break or crumble, the dropping or slinging by the conveyor belt may easily damage the product.

SUMMARY OF THE INVENTION

The present invention comprises a conveyor which reduces the distance an exiting product falls and provides for a low impact release of the product from the conveyor. The conveyor comprises a plurality of cleats which have a product-carrying side and an opposite product-release side.

The product-release side of each cleat has a curved surface which allows the product item to slide from the cleat rather than being dropped and damaged. The curved product-release surface also decreases the momentum of the product item leaving the conveyor to reduce the risk of damaging the product.

One object of the present invention is to provide a conveyor constructed of linked conveyor modules.

Another object of the present invention is to provide a conveyor suitable for use at various angles of inclination.

Yet another object of the present invention is to provide a conveyor which effects low-impact release of product from the conveyor to a receiving surface, container or another conveyor.

Other objects, features and advantages of the present invention are apparent from the following detailed description when read in conjunction with the accompanying drawings and appended claims.

BRIEF DESCRIPTION OF THE DRAWINGS

FIG. 1 is a partly diagrammatical, perspective view of a conveyor constructed in accordance with the present invention.

FIG. 2 is a partly diagrammatical side view of a conveyor constructed in accordance with the present invention.

FIG. 3 is an exploded perspective view of one of the cleats, spacers and link pins of the conveyor of FIG. 1.

FIG. 4 is a side elevation of the cleat shown in FIG. 3.

FIG. 5 is a partly diagrammatical side view of the conveyor of FIG. 2. For simplicity of illustration, only two cleats are shown in a product-carrying position.

FIG. 6 is the same view as FIG. 5, but with the two cleats in a product-shifting position at the transfer end of the conveyor.

FIG. 7 is a view similar to FIGS. 5 and 6, but with the two cleats in a product-releasing position.

FIG. 8 is a partly diagrammatical side view of a vertical conveyor constructed in accordance with the present invention. For simplicity of illustration, only two two-way cleats is shown. One of the cleats is in a product-releasing position.

FIG. 12 is a partly diagrammatical side view of a conveyor constructed in accordance with the present invention and comprising reverse-bend cleats. For simplicity of illustration, only two reverse bend cleats are shown. The cleats are in a product-carrying position.

FIG. 13 is the same view as FIG. 12, but with the reverse bend cleats in a product-shifting position.

FIG. 14 is a view similar to FIGS. 12 and 13, but with one of the reverse-bend cleats in a product-releasing position.

DETAILED DESCRIPTION OF THE PREFERRED EMBODIMENTS

Figure 9:
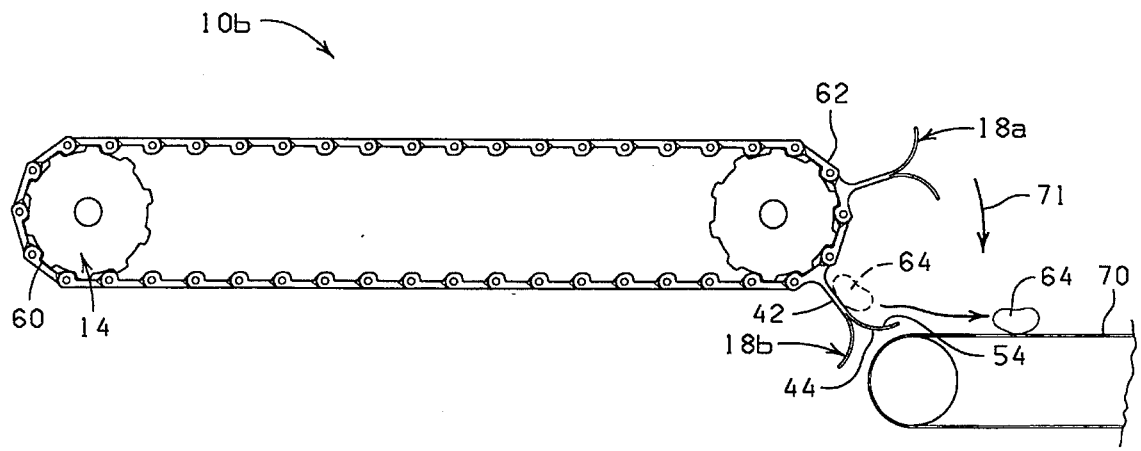
FIG. 9 is a partly diagrammatical side view of a horizontal conveyor constructed in accordance with the present invention. For simplicity of illustration, two two-way cleats are shown. One of the cleats is in a product-releasing position.

Referring to the drawings in general, and to FIG. 1 in particular, shown therein and designated by the general reference numeral 10 is a conveyor, which includes an endless loop 12, a sprocket and chain assembly 14 and a motor 16 for driving the rotation of the endless loop 12. The endless loop 12 comprises a plurality of two-way cleats 18 which are linked together. For simplicity of illustration, the motor 16 is omitted from subsequent drawing figures.

The two-way cleats 18 extend across the conveyor 10 in rows. For clarity of illustration, only one row of two-way cleats 18 are shown in FIG. 1. However, it should be appreciated that rows of two-way cleats 18 extend outward from the endless loop 12 completely around the endless loop 12, substantially as shown in FIG. 2. Although only two cleats 18 are shown in the row in FIG. 1, it should be appreciated that each row of cleats 18 may comprise any suitable number of two-way cleats 18 in order to obtain the desired width for the endless loop 12.

Typically, the rows of two-way cleats 18 are uniformly spaced to accommodate the size and shape of the particular product being handled by the conveyor 10. In the case of some products, the conveyor belt 10 may be composed of only two-way cleats 18. However, additional spacing between the two-way cleats 18 may be required for other products.

As shown in FIG. 3, each two-way cleat 18 may be assembled with a spacer 20 to provide the proper spacing between the rows of two-way cleats 18. Each spacer 20 has a substantially flat upper surface 22 and a plurality of link members extending from both sides of the spacer 20.

One of the link members is designated by reference numeral 24 and is generally representative of the link members of the spacer 20. The link members 24 are separated by link spaces. One of the link spaces is designated by reference numeral 26 and is generally representative of the link spaces of the spacer 20.

Typically, the link members 24 on one side of each spacer 20 are staggered with the link members 24 on the other side of the spacer 20. That is, each link member 24 on one side of the spacer 20 is opposite a link space 26 on the other side of the spacer 20. Each link member 24 has a slot 28 for receiving a link pin 30 to pivotally connect each side of the spacer 20 to one of the two-way cleats 18 or to another spacer 20.

Each two-way cleat 18 has a plurality of link members 32, link slots 34 and link spaces 36 which are complementary to those of each spacer 20. Thus, one of the two-way cleats 18 may be pivotally connected to one of the spacers 20 by disposing the link members 32 on one side of the two-way cleat 18 in the respective link spaces 26 of the spacer 20 and inserting the link pin 30 through the link slots 28 and 34 of the spacer 20 and the two-way cleat 18, respectively.

With reference to FIGS. 3 and 4, the remaining structure of the two-way cleat is now described. Each two-way cleat 18 has a base 40, a trunk 42 and a pair of arms 44.

The base 40 has a first side 46 and an opposite-second side 48. The link members 32 extend from the first and second sides 46 and 48 of the base 40 of the two-way cleat 18.

The trunk 42 extends from the base 40 in a direction substantially perpendicular to the plane of the base 40. Further, the trunk 42 has a curved surface 50 proximate to the base 40 of the two-way cleat 18 and a substantially flat surface 52 distal from the base 40.

As best seen in FIG. 4, the arms 44 of the two-way cleat 18 diverge from the end of the trunk 42 which is distal from the base 40. Each arm 44 bends from the trunk 42 over the link members 32 of the respective side 46 or 48 of the base 40. With this construction, the curvature of each arm 44 provides a substantially cylindrical-concave surface 54 for supporting product items.

It should be appreciated that the two arms 44 of each two-way cleat 18 have substantially the same size, shape and curvature. Thus, the two-way cleat 18 may be rotated with either arm 44 leading or trailing to perform its intended function.

Operation of the Two-Way Cleat

Referring to FIGS. 5 through 7, the operation of two-way cleats 18 with the inclined conveyor 10 is illustrated. For simplicity of illustration, only two cleats 18a and 18b are shown in FIGS. 5 through 7. However, it should be appreciated that rows of two-way cleats 18 are located around the entire conveyor 10.

With reference to FIG. 5, shown therein is the inclined conveyor 10, which has a return end 60 and a transfer end 62. The two two-way cleats 18a and 18b are shown at a product-carrying point of the conveyor 10. At this point, a product item 64 is being carried up the incline of the conveyor 10 as indicated by direction arrow 66.

It should be appreciated that the product item 64 may be transferred to the conveyor 10 at almost any point between the return end 60 and the transfer end 62 on the upper side of the conveyor 10. Similarly, release of the product item 64 may be at almost any point between the transfer end 62 and the return end 60 on the lower side of the conveyor 10. The release point for the product item 64 depends upon the degree of inclination of the conveyor 10 and the curvature of the cleats 18.

The trunk 42 of the two-way cleat 18a supports the product item 64. For some sizes of product items and two-way cleats 18, the curved surface 54 of the two-way cleat 18a may support the product item 64 as well.

Referring to FIG. 6, the product item 64 and the two-way cleats 18a and 18b have reached the transfer end 62 of the conveyor 10. As the conveyor 10 rotates in the direction indicated by rotational arrow 68, the product item 64 shifts by gravity from cleat 18a to cleat 18b. The position of the product item 64 before the shift is shown in dashed lines and the position of the product item 64 after the shift is shown in solid lines. After the shift takes place, the product item 64 is carried by the trunk 42 and perhaps the curved surface 54 of the arm 44 of the two-way cleat 18b.

With reference to FIG. 7, the product item 64 and the two-way cleat 18b have finally reached the point of exit from the conveyor 10. At the exit point, the force of gravity and the curved surface 54 of the arm 44 of the cleat 18b combine to gently deposit the product item 64 on an output surface 70. It should be appreciated that the output surface may be another conveyor, a product container or package or any other device or article used in processing and packaging products.

The curved surface 54 of the arm 44 of each two-way cleat 18 allows the product item 64 to gently slide from the cleat 18 to the output surface 70 rather than to fall precipitously. In the case of a fragile product, such as a potato chip, the low-impact delivery by the curved surface 54 of each cleat 18 reduces breakage of the product and prevents seasonings from being jarred off the product. Thus, the curved surfaces 54 of the cleats 18 provide for movement of product without subjecting the product to damage and inconsistent seasoning which may be caused by fall of the product from one surface to another.

With reference to FIG. 8, shown therein is a vertical conveyor 10a utilizing the two-way cleat 18. For simplicity of illustration, only one two-way cleat 18 is shown. However, it should be appreciated that a plurality of rows of two-way cleats 18 are located around the entire conveyor 10a.

Because of the verticality of the conveyor 10a, the exit point is near the return end 60 of the conveyor 10a. The shift of the product item 64 from cleat 18a to cleat 18b takes place at the transfer end 62.

The two-way cleat 18b is shown at the exit point of the conveyor 10a. The curved surface 54 of the arm 44 of the two-way cleat 18b allows the product item 64 to be gently deposited on the output surface 70. It should be appreciated that the product-carrying and product-shifting features of the vertical conveyor 10a are exactly like those described hereinabove for the inclined conveyor 10.

Referring to FIG. 9, shown therein is a horizontal conveyor 10b employing the two-way cleats 18. For simplicity of illustration, only two two-way cleats 18a and 18b are shown. However, it should be appreciated that a plurality of rows of two-way cleats are located around the entire conveyor 10b.

In the case of the horizontal conveyor 10b, there is no need to carry the product up an incline. However, the product-shifting and product-outputting features described hereinabove are present in the horizontal conveyor 10b.

In FIG. 9, the two-way cleats 18a and 18b are positioned at the transfer end 62 of the conveyor 10b. At the transfer end 62 of the horizontal conveyor 10b, the shift and deposit of the product item occur in close succession. When the cleats 18a and 18b rotate into the bend 62, as indicated by rotational arrow 71, the product item 64 shifts from cleat 18a to cleat 18b. As the cleats 18a and 18b continue through the bend 62, the curved surface 54 of the arm 44 of two-way cleat 18b gently deposits the product item to the output surface 70.

Reverse-Bend Cleat

Figure 10:
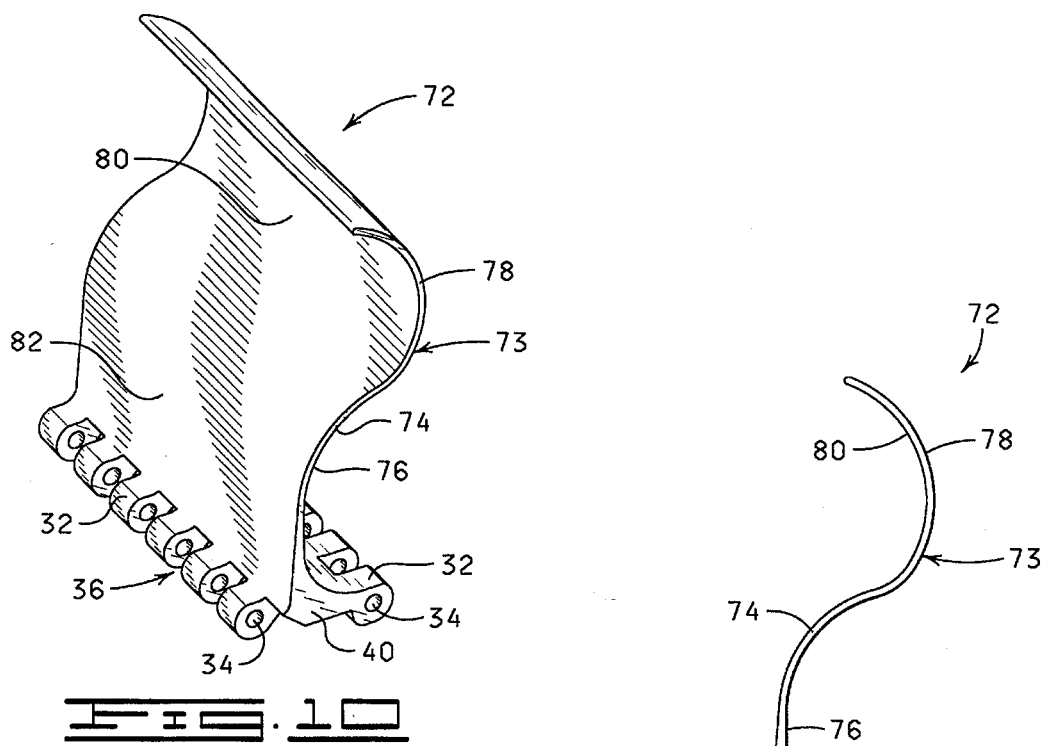
FIG. 10 is a perspective view of an extended reverse bend cleat constructed in accordance with the present invention.
Figure 11:
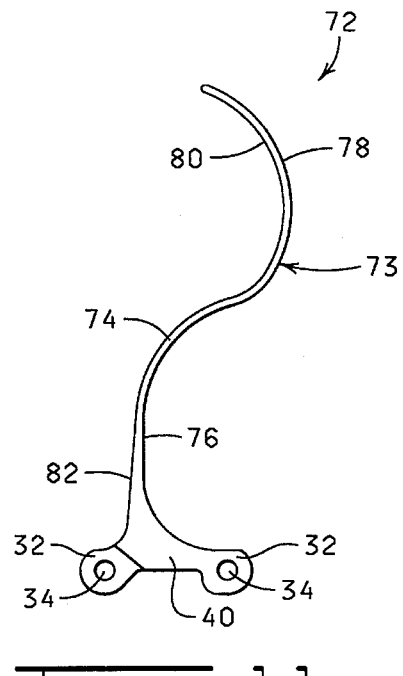
FIG. 11 is a side elevation of the cleat shown in FIG. 10.

With reference to FIGS. 10 and 11, shown therein and designated by reference character 72 is a reverse-bend cleat. The reverse-bend cleat 72 has basically the same base 40, link members 32, link slots 34 and link spaces 36 as the two-way cleat 18. Further, the reverse-bend cleat 72 is pivotally connected to spacers 20 and other reverse-bend cleats 72 in the same manner as described hereinabove for the two-way cleat 18.

Instead of a trunk and divergent arms, however, the reverse-bend cleat 72 has a flight 73 extending from the base 40. The flight 73 has two major bends. A first bend 74 defines a product-carrying surface 76 proximal to the base 40. A second bend 78 defines a product-releasing surface 80 distal to the base 40 and on the side opposite to the product-carrying surface 76.

Both of the surfaces 76 and 80 are curved for receiving and supporting product items. More particularly, the surfaces 76 and 80 are substantially semi-cylindrical and concave in shape.

Opposite the product-carrying surface 76 of the reverse-bend cleat 72 is a transfer surface 82. The transfer surface 82 is contoured such that product items shifting to the transfer surface 82, when the transfer surface 82 is upwardly disposed, will slide into the product-releasing surface 80.

Referring to FIG. 12, shown therein is an inclined conveyor 10c utilizing reverse-bend cleats 72. For purposes of simplicity, only two reverse-bend cleats 72a and 72b are shown. However, it should be appreciated that a plurality of rows of reverse-bend cleats 72 are located around the entire perimeter of the conveyor 10c.

The conveyor 10c is rotated in the direction indicated by direction arrow 84. The product item 64 is being supported by the first product carrying surface 76 of the cleat 72a as the product item 64 is carried up the incline of the conveyor 10c.

As shown in FIG. 13, the pair of reverse-bend cleats 72a and 72b eventually reach the transfer end 62 of the conveyor 10c. At this point, the product item 64 shifts by gravity from the cleat 72a to the cleat 72b. In particular, the product item 64 slides along the conveyor 10c from the product-carrying surface 76 of cleat 72a to the transfer surface 82 of cleat 72b. Due to the contour of the transfer surface 82 of cleat 72b, the product item 64 then slides along the transfer surface 82 into the product-releasing surface 80 of the cleat 72b.

As illustrated by FIG. 14, the product item 64 and the reverse-bend cleat 72b finally reach the point of exit from the conveyor 10c. The product item 64 gently slides from the product-releasing surface 80 of the reverse-bend cleat 72b to the output surface 70. The curved product-releasing surface 80 of the cleat 18b deposits the product item 64 on the output surface 70 without a precipitous fall which could break the product item or adversely affect any seasoning or coating on the product item 64.

It should be appreciated that a conveyor with reverse-bend cleats 72 may be inclined, vertical or horizontal. The operation of the vertical and horizontal conveyors with reverse-bend cleats 72 is substantially the same as that disclosed hereinabove for vertical and horizontal conveyors 10a and 10b, respectively.

Changes may be made in the combinations, operations and arrangements of the various parts and elements described herein without departing from the spirit and scope of the invention as defined in the following claims.

What is claimed is:

1. A conveyor comprising:

an endless loop having a transfer end, a return end, a product-receiving point and a product-releasing point;

means for rotating the endless loop; and a plurality of cleats extending outwardly from the endless loop in spaced arrangement and having one side with a product-carrying surface and an opposite side with a product-releasing surface, each one of the cleats comprising:

a base having a first side and a second side;

a flight extending from the base between the first side and the second side of the base, the flight having a first bend proximate to the base and a second bend distal from the base, the first bend and the second bend being substantially reverse to one another, the first bend defining the product-carrying surface and the second bend defining the product-releasing surface of the cleat;

wherein product items disposed between each pair of first and second adjacent cleats shifts by gravity from between the first and second cleats to the product-releasing surface of the second cleat at the transfer end of the endless loop and wherein the product items slide by gravity from the product-releasing surface of the second cleat when the second cleat rotates to the product-releasing point of the conveyor.

2. The conveyor of claim 1 wherein the product-carrying surface is substantially concave and semi-cylindrical in shape.

3. The conveyor of claim 1 wherein the product-releasing surface is substantially concave and semi-cylindrical in shape.

4. The conveyor of claim 1 wherein each one of the cleats further comprises:

a transfer surface opposite the first bend and located between the base and the second bend of the cleat, the transfer surface being contoured such that a product shifted onto the transfer surface when the transfer surface is disposed substantially upward slides by gravity on the transfer surface onto the product-releasing surface.

5. A conveyor cleat comprising:

a base having a first side and a second side;

a flight extending from the base between the first side and the second side of the base, the flight having a first bend proximate to the base and a second bend distal from the base, the first bend and the second bend being substantially reverse to one another;

wherein the first bend defines a product-carrying surface and the second bend defines a product-releasing surface of the cleat.

6. The conveyor cleat of claim 5 wherein the product-carrying surface is substantially concave and semi-cylindrical in shape.

7. The conveyor of claim 5 wherein the product-releasing surface is substantially concave and semi-cylindrical in shape.

8. The conveyor of claim 5 wherein each one of the cleats further comprises:

a transfer surface opposite the first bend and located between the base and the second bend of the cleat, the transfer surface being contoured such that a product shifted onto the transfer surface when the transfer surface is disposed substantially upward slides by gravity on the transfer surface onto the product-releasing surface.

* * * * *